United States Patent [19]

Eriksson

[11] 4,390,310
[45] Jun. 28, 1983

[54] TAPPING ATTACHMENT

[75] Inventor: Alf Eriksson, Nacka, Sweden

[73] Assignee: Aktiebolaget Svenska Precisionsverktyg, Sweden

[21] Appl. No.: 161,259

[22] Filed: Jun. 20, 1980

[30] Foreign Application Priority Data

Jun. 20, 1979 [SE] Sweden ............................ 7905456

[51] Int. Cl.³ ............................................ B23B 47/24
[52] U.S. Cl. .................................................. 408/141
[58] Field of Search ................ 409/70; 408/138, 139, 408/140, 141, 142, 129; 10/140

[56] References Cited

U.S. PATENT DOCUMENTS

| | | | |
|---|---|---|---|
| 3,032,156 | 5/1962 | Eriksson | 408/141 X |
| 3,037,393 | 6/1962 | Bernhard | 408/140 X |
| 3,325,037 | 6/1967 | Hartman | 408/141 X |
| 3,656,858 | 4/1972 | Eriksson | 408/139 |
| 3,787,136 | 1/1974 | Steiner | 408/139 |
| 4,174,918 | 11/1979 | Tanaka | 408/139 |

Primary Examiner—William R. Briggs
Attorney, Agent, or Firm—William A. Drucker

[57] ABSTRACT

Thread-milling machine incorporating one driving and one driven unit (14, 10), between which are provided means for the transfer of torque (22) permitting mutual axial displacement of the two units. Between the two units are mounted spring elements, one of which (36) is tensioned when the units are moved away from one another and the other (58, 60) being tensioned when the two units are moved in the opposite direction to this. The elements (34, 50) mounted between the spring elements are so arranged as to balance the freedom of movement of the units towards or away from each other from an initial position determined by the tension of the springs. The elements (34, 50) mounted between the spring elements are provided with pressure devices (88; 96; 108; 116) so designed as to increase the resistance to axial displacement of the units towards one another regardless of the preset positions of the units (14, 10).

12 Claims, 6 Drawing Figures

TAPPING ATTACHMENT

The present invention relates to a tapping attachment machine incorporating one driving and one driven unit, between which are provided means for the transfer of torque. The latter elements permit mutual axial displacement of the two units, spring elements being mounted between them, one of which is tensioned when the units are moved away from one another and the other being tensioned when the two units are moved in the opposite direction to this. The elements mounted between the spring elements are so arranged as to balance the freedom of movement of the units towards or away from each other from an initial position determined by the tension of the springs.

A thread-milling machine of the type to which the present invention may be applied is described in Swedish Pat. No. 225 055. Reference may be made to this patent for details of design and function not directly related to the invention to be discussed in the following.

Thread-milling machines of the type under discussion are normally used in such manner that each threading cycle is carried out by a large number of synchronously controlled milling machines performing the same operation. Here, it is of great importance that initiation of the threading operation be synchronized so as to permit every cutting tool on each one of the milling machines always to commence cutting at exactly the same time. If this is to be possible it is of advantage that the collaring pressure of the milling machines is relatively high; and it is particularly desirable for the collaring pressure to be high during the initial stage of the operation only, tool pressure being lower during the remaining stages of the threading cycle.

The main objective of the invention is therefore to achieve a thread-milling machine working at a high collaring pressure, thereby allowing a number of synchronously operating thread-cutting tools to commence the threading cycle at the same time and cut into their respective workpieces to exactly the same depth. This is achieved in that the invention provides for a thread-milling machine of the type described in the introductory paragraph, primarily characterized in that the elements mounted between the spring elements are provided with pressure devices so designed as to increase the resistance to axial displacement of the units towards one another, regardless of the positions of the units in relation to one another. It is of particular advantage if the pressure devices are designed so as to increase this resistance only momentarily as compression begins.

In the following paragraphs the invention will be described in greater detail by reference to a suggested embodiment illustrated in the accompanying drawings.

First follows a description summarizing the design of the conventional type of thread-milling machine, the description essentially conforming with that of Swedish Pat. No. 225 055 referred to in the introduction to the present.

Figure 1:
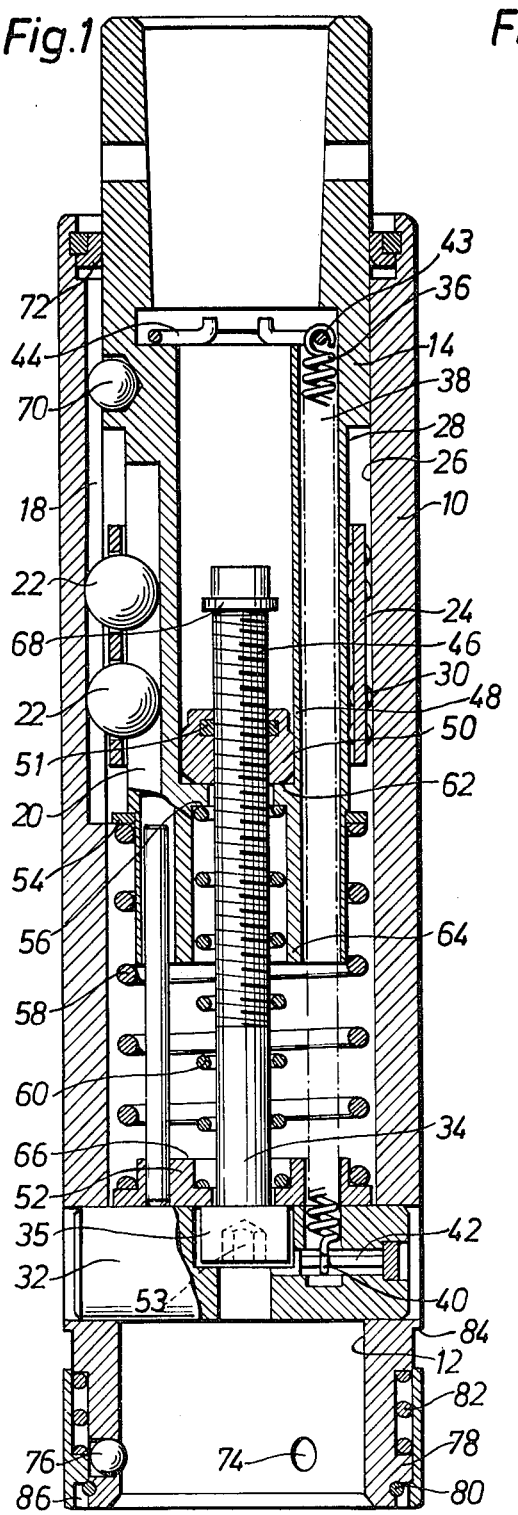
FIGS. 1 and 2 show a longitudinal section through a conventional thread-milling machine, FIG. 1 showing the machine under a relatively small compression load and FIG. 2 showing it under conditions of maximum load.
Figure 2:
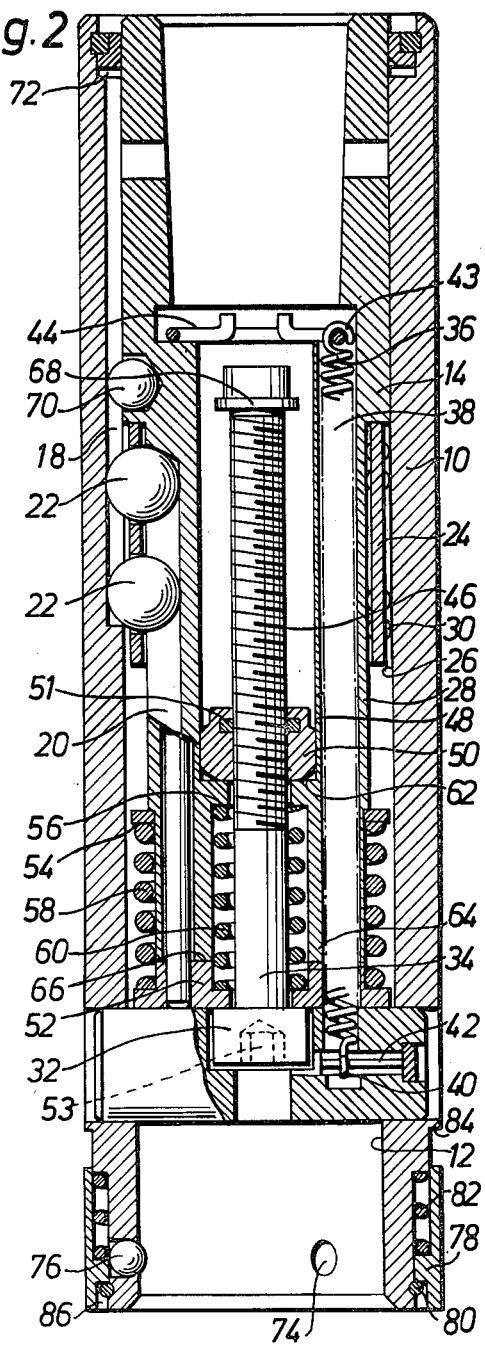

In FIGS. 1 and 2 the numeral 10 is used to designate a housing, also referred to as the driven unit, one end of which is provided with a recess 12 into which a tap holder, not shown here, may be fitted. A sliding element 14, also referred to as the driving unit, is fitted inside the other end of the housing 10 and is designed to be connected with a spindle or similar part of a machine tool. When the thread-milling machine is operating, torque is normally transferred via a coupling, not shown here, attached to the driving unit 14. Both units 10, 14 are axially displaceable relative to one another even while torque is being transferred between the two. To enable this it is suitable to provide the interior of the housing 10 with a longitudinal groove 18 and the exterior of the sliding element 14 with a similar, corresponding groove 20. In these grooves, the cross section of which forms a circular arc, two balls 22 are fitted so as to be able to roll along the grooves as the two units 10, 14 are axially displaced in relation to one another. The balls 22 are kept in position by a ball retainer 24 pierced with holes of a size appropriate to the diameter of the balls 22. Smaller-sized balls 30, distributed in large numbers round the circumference of the retainer and fitting into especially provided holes in this, are mounted between the cylindrical surfaces 26, 28 of the housing 10 and the sliding element 14, preferably under initial pressure. As the two units 10, 14 are axially displaced in relation to one another, these balls 30 roll against their surfaces 26, 28, thereby ensuring that the ball retainer will be kept in the correct position and hence the larger balls 22 as well. Since two balls 22 are used in the grooves 18, 20, only a small amount of leverage is needed to produce the required torque, and this, in turn, is a contributing factor towards enabling the machine to be designed with a relatively small diameter. This is a particularly valuable asset if a number of thread-milling machines are to be mounted for milling a large quantity of holes the centre-to-centre distance of which is small.

A carrier stud 32 is rigidly secured in the driven unit 10. On this rests a supporting rod 34 taking the form of a screw provided with a head 35. A spring device, which may comprise two or more tension springs 36, extends through corresponding holes 38 drilled in the sliding element 14 and is secured by hooking the ends of the springs 40, which terminate in a small loop or eye, round a pin 42 ajoining the stud 32. The other ends of the springs are secured by hooking the loop 43 round an element 44 provided for this purpose in the sliding element 14.

A section of the supporting rod 34 is provided with an external thread 46 and is located inside a pair of the sliding element 14 having a noncircular internal surface 48: instead, it may, for example, be hexagonal in cross section. A nut 50, the outer circumference of which is given the same shape, is threaded onto the thread 46 of the supporting rod and provided with a self-locking washer 51 of conventional type. Therefore, if the supporting rod 34 rotates in relation to the sliding element 14, the nut will be axially displaced in relation to the supporting rod but will not rotate in relation to the sliding element. Rotation of the supporting rod 34 may be carried out by means of a hexagon spanner, not shown here, which may be inserted through an opening 51 provided for the purpose in the stud 32. This permits the driving unit 14 to take up different axial positions relative to the supporting rod and thereby to attain varying degrees of tension.

The spring device 36 is kept under slight tension. The force it exerts is transferred to the carrier stud 32.

Mounted at the lower end of the supporting rod 34 is a ring-shaped element 52, and two compression springs 58, 60 are concentrically fitted between this and collars, 54 and 56, located at the lower end of the sliding element 14. The degree of tension of the compression springs 58, 60 is determined by the position of the nut 50 relative to the two elements here designated 14 and 34. In the drawing, the nut 50 is under tension in its initial position since it is bearing upon a collar 62 located on the sliding element 14. In this particular case, the lower end 64 of the sliding element is able to bear on the shoulder 66 of the ring-shaped element 52 (see FIG. 2), meaning that the springs 58, 60 are compressed to a maximum and cannot be further loaded. The position of the nut 50 at the other end of the rod is determined by a retaining ring 68. When the nut 50 is bearing on the retaining ring the springs 58, 60 have reached their maximum length. They are tensioned to a suitable degree.

When the end position is as shown in FIG. 2, the driven unit 10 will only be acted on by the spring device 36, since it moves in a downward direction from the driving unit 14 secured in the machine tool. The amount of movement between the two parts is determined by the length of the grooves 18, 20. A ball 70, located in the driving unit 14 and moving in the groove designated 18, and a retaining ring 72 on the driven unit 10 set a limit to the movement of the latter in a downwards direction from the driving unit.

As the collars 54, 56 move away from the shoulder 66 of the ring-shaped element 52, the nut 50 being screwed upwards along the thread 46, the driven unit 10 is able to move towards the driving unit 14 as a result of the compression force of the springs 58, 60, which is greater than that of the spring device 36. The driven unit 10 is displaced in a direction away from the driving unit 14 to the same extent as the nut 50 is screwed along the supporting rod 34, meaning that the position of the moving components can be varied as desired, either backwards or forwards, within the limits of their total axial freedom of movement. A further consequence of this design is that the height of the screw tap can be adjusted as desired. This permits the taps to be individually adjusted to the various levels of the holes drilled in the workpiece during simultaneous threading by several milling machines at once. The extent to which the driven unit 10 is free to move in either direction is dependent on the position of the nut 50 relative to the supporting rod 34.

The tap holder referred to above can be fitted to the carrier stud 32. The driven unit 10 is provided with a number of holes 74, three for example, distributed round the circumference and so designed as to allow balls 76 a limited freedom of movement in a direction radially inwards. Outside the holes, a sleeve 76 is axially displaceable by the action of a spring 82 as far as a stop 80. When the sleeve 78 is forced up against the stop designated 84 by the compression force of the spring 82, a cavity 86 is brought into position opposite the balls 76, which are thereby given enough freedom of movement as to be able to move completely out of the recess 12. However, they do not fall out. The tap holder may now be introduced into the recess, and when the sleeve 78 returns to the locked position through the action of the spring 82 it forces the balls 76 inwards and into a groove provided on the outer circumference of the tap holder, which is thereby axially locked. It is therefore a simple operation to fit and remove the tap holder.

The invention will now be described with special reference to FIGS. 3 to 6. The four embodiments illustrated in these serve to show the increase of tool pressure with maintenance of pressure throughout the threading cycle and a momentary increase of pressure in the machine during its initial, compression stage.

Those parts of the apparatus shown in FIGS. 3–6 directly corresponding to parts illustrated in FIGS. 1–2 are assigned the same numerals.

Figure 3:
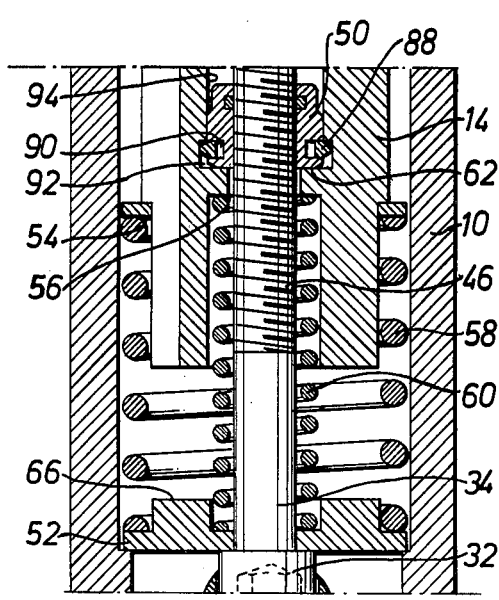
FIGS. 3-6 show axial, longitudinal sections of a central part of thread-milling machines of the type illustrated in FIGS. 1 and 2, the machines being fitted with various elements designed according to the principles of the invention for the purpose of increasing the collaring pressure of the machine in question.

In the embodiment illustrated in FIG. 3, the pressure device incorporates a thrust collar 88 fitting into an annular groove 90 provided in the nut 50. In the initial position shown in the figure, the outer part of the thrust collar, which is essentially triangular in section, extends into an annular groove 92 in the sliding element 14. In the initial stages of compression the collar 88 is forced towards the bottom of the groove 90 on the nut, resistance being momentarily high, after which the outer circumference of the collar will be pressed against the inner surface 94 of the sliding element 14. The collar 88 presses against the sliding element during the whole compression stage and also as the supporting rod 34 and nut 50 are returned to their initial position. Once the collar is again level with the groove 92 in the sliding element 14 it is forced by its own tension into the groove.

Figure 4:
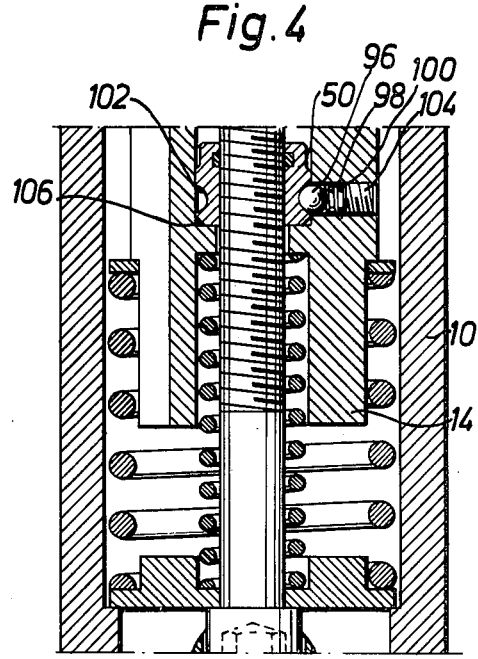

In the embodiment illustrated in FIG. 4, collaring pressure is momentarily increased only at the beginning of the compression stage. In this case, one or more balls 96 are engaged so as to be able to press against the nut 50 from a transversal cavity or recess 98 in the sliding element 14. Pressure is exerted by means of a compression spring 100 mounted behind each ball. With the nut 50 in the position shown, each ball 96 engages in a corresponding recess 102 provided in the nut 50. The pressure exerted by the balls may be adjusted by means of an adjustment screw 104, which may be screwed into the recess 98 once this has been appropriately threaded. The position of this adjustment screw may be altered at will by a hexagon spanner not illustrated here. When the nut 50 is displaced in an upward direction relative to the sliding element 14, the balls 96 are moved out of their recesses 102 but will remain in their original cavities or recesses 98 owing to the shape of the latter. During the compression stage, and also while the supporting rod 34 and nut 50 are being returned to their original position, no pressure is exerted by the balls 96. The under circumference of the nut is bevelled so as to facilitate the passage of the balls 96 back to their respective recesses 102 when the nut is being returned.

Figure 5:
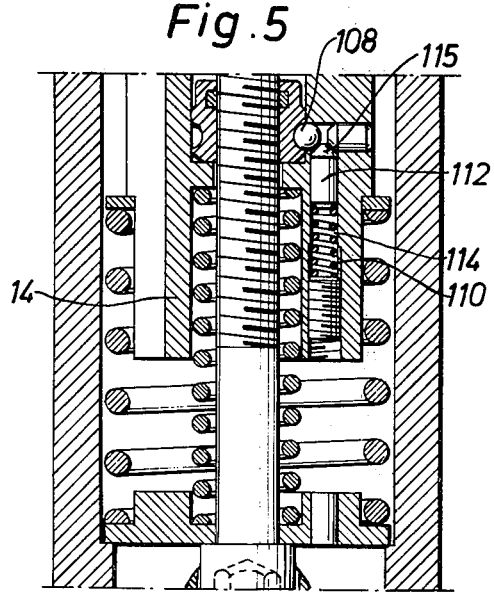

The embodiment illustrated in FIG. 5 incorporates balls 108 having the same function as the balls designated 96 in FIG. 4. However, instead of springs 100, a combination of springs 110 and pins 112 is used, these being mounted in recesses 114 provided longitudinally in the sliding element 14. The end of the pins 112 pressing against the balls 108 is bevelled to form the shape of a truncated cone 114.

Figure 6:
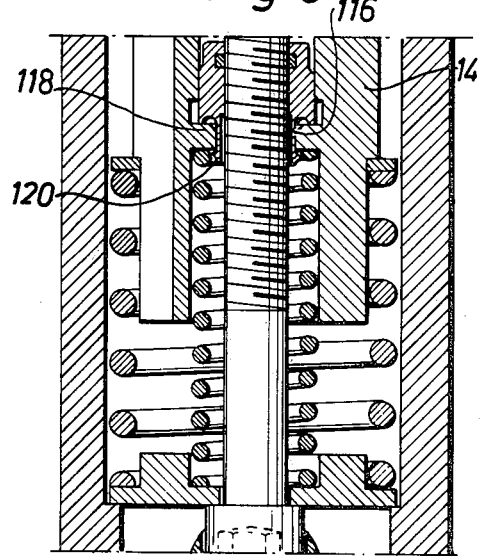

In the embodiment illustrated in FIG. 6, tool pressure is also momentarily increased as compression is initiated. Instead of balls pressing against the nut 50, this embodiment incorporates a slotted flange 116 projecting downwards from the nut. The nut and flange are designed to form an integral whole. During the initial stage the flange 116 bears against a collar 118 projecting from the sliding element 14, an annular lip 120 extending in under the collar. When the pressure is first exerted the lip is forced up over the inner circumference of the shoulder. After a short interval it "snaps" out again and compression is continued without any further pressure being exerted by the flange. Finally, when the nut 50 is returned to its initial position the flange 116 will again be caused to project out over the collar 118 and take up its initial position shown in FIG. 6.

The supporting rod 34 and nut 50, the elements provided for pre-adjusting the axial position of the thread-milling machine, may be designed for step-by-step and multistage adjustment of this position. Such a design is not especially illustrated in the drawings, but the components designated 34 and 50 may, for example, be designed to receive a separate sleeve, in which are cut slots of suitable dimensions, and a circlip fitting into grooves, provided at various heights in the sleeve and sliding element 14. An arrangement of this nature would permit varied adjustment of the sleeve and hence varying compression in the spring providing the tool pressure.

The invention described above is clearly not limited to the embodiments illustrated in the accompanying drawings but may be modified in the widest sense of the term while yet adhering to the underlying principles of the invention.

I claim:

1. A tapping attachment comprising one driving and one driven unit between which are provided means for the transfer of torque permitting mutual axial displacement of the two units, between which are mounted spring elements, one of which is tensioned when the units are moved away from one another and the other when the two units are moved in the opposite direction to this, in which adjustable stop elements mounted between the spring elements are so arranged as to limit the freedom of movement of the units toward or away from one another from an initial preset position determined by the tension of the springs, characterized further including pressure devices known per se acting upon the adjustable stop elements located between the spring elements in order to increase the resistance to axial displacement of the units towards one another regardless of the initial preset position of the units.

2. A tapping attachment according to claim 1 characterized in that the balance between the spring elements is such that the elements will always return to their preset initial positions after the completion of the threading cycle.

3. A tapping attachment according to claim 2 characterized in that the pressure devices are designed so as to increase the resistance to axial displacement of the units only momentarily as compression begins.

4. A tapping attachment according to claim 2 characterised in that the pressure devices are designed so as to increase the resistance to axial displacement of the units momentarily as compression begins, and so as to maintain at least some of the increased resistance during continued axial displacement of the units.

5. A tapping attachment according to claim 2 characterized in that the pressure devices are designed to resist axial displacement of the units both during the entire period of compression and during the period needed for expansion of the machine.

6. A tapping attachment according to claim 5 characterized in that the pressure devices, at least in the initial position, partly project into recesses in the elements located between the spring devices and are so designed as to exert pressure on at least one of the elements during the increase of resistance referred to in the preceding claim.

7. A tapping attachment according to claim 6 characterized in that a means of adjustment is provided for adjustment of the pressure exerted by the pressure devices.

8. A tapping attachment according to claim 6 characterized in that the pressure devices incorporate balls kept under pressure by springs.

9. A tapping attachment according to claim 6 characterized in that the pressure devices incorporate at least one thrust collar, the outer part of which, in its initial position, extends into an annular groove in the driving unit.

10. A tapping attachment according to claim 5 characterized in that the pressure devices consist of a slotted, spring-action flange projecting axially from one of the elements to bear against the driving unit.

11. A tapping attachment according to claim 1 characterized in that the elements determining the preset axial position are designed for step-by-step and multistage adjustment of this position.

12. A tapping attachment according to claim 11 characterized in that the elements determining the setting of the axial position are provided with means of resistance so as to be able to increase the resistance to compression.

* * * * *